Figure 1:
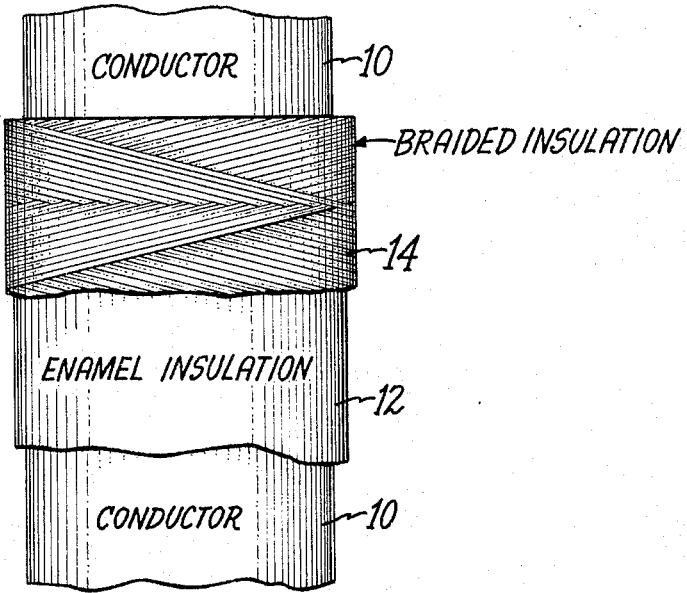

Sept. 27, 1966         W. F. M. GRAY          3,275,740
HIGH TEMPERATURE INSULATION FOR ELECTRICAL CONDUCTORS
Filed July 9, 1962

Inventor,
Willard F. M. Gray,
by Francis K. Doyle
His Attorney

United States Patent Office 3,275,740
Patented Sept. 27, 1966

3,275,740
HIGH TEMPERATURE INSULATION FOR
ELECTRICAL CONDUCTORS
Willard F. M. Gray, Hancock, Mass., assignor to General
Electric Company, a corporation of New York
Filed July 9, 1962, Ser. No. 208,470
5 Claims. (Cl. 174—121)

This invention relates to electrical conductors, and more particularly, to a high temperature insulation for use on an electrical conductor.

As is well known to those working in the electrical apparatus field, a continual effort is being made to increase the temperature at which various types of electrical apparatus can be safely operated. This has generally been referred to as thermally uprating of the electrical apparatus. These higher operating temperatures of electrical apparatus lead to a number of problems, many of which relate to the various types of insulation used in such electrical apparatus. One problem which has been constantly present in operating electrical apparatus at high temperatures, is that of the various types of insulation suffering a decrease in its electrical resistance as it is subjected to higher temperatures. This is generally referred to as the dissipation factor of the insulation. A high dissipation factor generally indicates a low resistance of the insulation at a high temperature, while a low dissipation factor, in general, indicates a high resistance at high temperatures. Presently, a high temperature, when referring to electrical apparatus, is generally considered to be a temperature of 175° C. or higher.

As will be appreciated by those skilled in the electrical apparatus art, electrical apparatus is subject to varying degrees of temperature as it is operated at its capacity or at loads beyond its normal capacity. Portions of the apparatus are subjected to substantially higher temperatures within the apparatus than the normal outside temperature of the apparatus. For example, in electrical transformers, when the outside temperature of the transformer is around 100° C. various portions of the coil of the transformer may be at temperatures in excess of 175° C. These high temperatures in electrical apparatus are generally called "hot spots" and it is these "hot spots" that often lead to failure of electrical apparatus during overload conditions.

When portions of a winding of an electrical apparatus are subjected to a "hot spot" temperature, the insulation on the conductor, which forms the winding, begins to lose its high electrical resistance. This is particularly true of many types of film insulation formed from any of the well known enamel insulations. These enamels generally have a high dissipation factor when subjected to temperatures in the order of 175° C. Continued operation of the apparatus with such hot spots leads to failure of the insulation, and thus, failure of the electrical apparatus. It is clearly desirable to provide conductor insulation which has a low dissipation factor to alleviate this high temperature "hot spot" problem in electrical apparatus.

One method of overcoming this problem would be to apply a film coating to the conductor which has a very low dissipation factor. However, the types of material which provide low dissipation factors are also very resistant to high temperatures, and thus, make it very difficult to apply the material to the conductor as a film. Alternatively, these low dissipation factor insulations could be applied to the conductor as a porous coating of filaments of material having a low dissipation factor to obtain the desired low dissipation factor substantially in the manner set forth in application Serial No. 135,194, filed August 31, 1961, now Patent No. 3,132,205, for Porous Coating for Electrical Conductors in the name of the present inventor and assigned to the same assignee as this invention. However, in order to provide the desired insulation strength in both sixty cycle and impulse breakdown levels, it may be necessary to provide a thick coating of the porous insulation. These thick porous insulations increase the overall size of the structure, as will be understood, and thus lower the space factor of the conductor thereby requiring a substantially larger space for a coil insulated in this manner.

It has been discovered that if an electrical conductor is provided with a thin porous coating of high temperature filamentary material over a thin enamel film that the best advantages of both insulations can be obtained. This combined insulation coating will provide a conductor having a low dissipation factor with a high electrical insulation strength for both sixty cycle and impulse breakdown, and will also provide for good space factor of the conductor.

It is therefore one object of this invention to provide an insulated electrical conductor having a low dissipation factor, high electric strength, with a good space factor for the conductor.

A further object of this invention is to provide an electrical conductor with insulation having good impulse and sixty cycle breakdown strength, while at the same time providing a low dissipation factor.

A still further object of this invention is to provide an insulated electrical conductor having two insulations, one insulation providing high impulse and sixty cycle breakdown strength, while the second insulation provides a low dissipation factor to the conductor.

In carrying out this invention in one form, an electrical conductor is provided with a thin film of insulating enamel having high impulse and sixty cycle breakdown strength. A porous coating of filamentary material having a low dissipation factor is formed over the enamel insulation, thereby providing an electrical conductor having a low dissipation factor with good sixty cycle and impulse breakdown strength.

Figure 2:
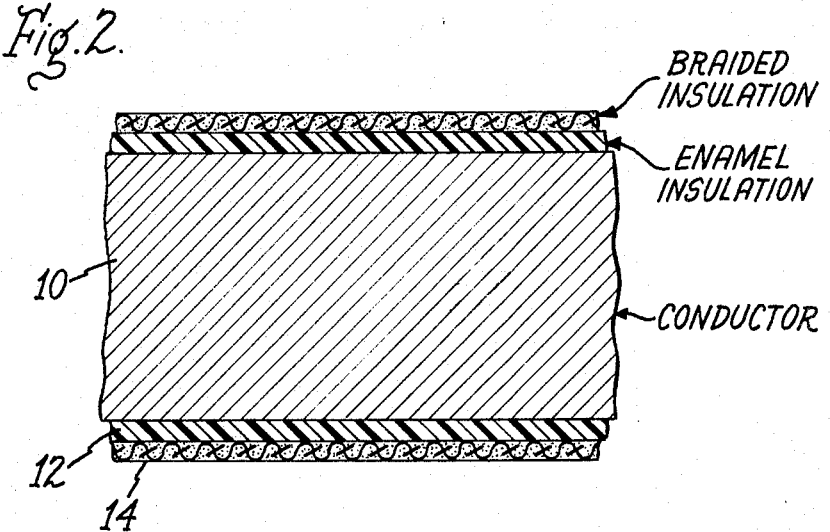

The invention which is desired to be protected will be particularly pointed out and distinctly claimed in the claims appended hereto. However, it is believed that this invention, and the manner in which its objects and advantages are obtained, as well as other objects and advantages thereof, will be better understood from the following detailed description, especially when taken in the light of the accompanying drawing in which:

FIGURE 1 is a side view, with portions broken away, of an electrical conductor insulated according to one form of this invention; and FIGURE 2 is a sectional view of the insulated conductor shown in FIG. 1.

Referring now to the drawing, in which like numerals are used to indicate like parts throughout the various views thereof, there is shown an electrical conductor 10 provided with an enamel film insulation 12 and a porous filament insulation 14. The figures of the drawing provide a side view and a sectional view of an electrical conductor which is insulated according to one form of this invention. As shown by the drawing, the conductor 10 is first provided with a thin film coating of an enamel insulation 12. The enamel insulation will be cured in the usual manner, depending on the type of enamel used. Over the top of the enamel insulation 12 a porous coating is braided, served, or otherwise formed about the enamel insulation in the manner indicated at 14 of the drawing. For purposes of illustration the porous coating 14 is shown as a 3 wind per inch braid, over the enamel film 12.

As is shown, especially in FIG. 2, each of the insulations, that is, the enamel insulation 12, and the porous insulation 14, is provided as a very thin coating as compared to the size of the conductor. The thin film of the enamel insulation provides an excellent sixty cycle and impulse breakdown strength, while the porous coating of high temperature filamentary material provides for a very low dissipation factor to the insulated conductor. Thus it is seen, that by utilizing a thin film of each type of insulation, that the overall insulation on the conductor partakes of the best features of each type of insulation, thereby providing the desired conductor insulation. As can be seen from the figures, inasmuch as only very thin films of each insulation material is necessary to obtain the desired insulation for the conductor, the overall space factor of the conductor is very good.

In general, it has been found that polyamide filaments and polyester filaments, among others, will provide a very high electrical resistance at very high temperatures; that is, filaments of either polyamide or polyester will provide a low dissipation factor when used as insulation on an electrical conductor. As pointed out in the aforementioned application Serial No. 135,194, now Patent No. 3,132,205 when a filamentary material is wound about an electrical conductor to form a porous coating thereon, and where at least one dimension of the porous openings is substantially 3 mils, the porous coating will provide a dielectric strength of substantially 1,000 volts per mil when used in transformer oil. Thus, depending upon the desired insulation strength, the porous coating may be formed on the electrical conductor of the desired thickness to provide such insulation strength. However, as earlier noted in this application, in many installations to obtain the desired dielectric strength would require a substantial thickness of a porous coating at an average dielectric strength of 1,000 volts per mil.

As is well known, many enamel films provide a very high dielectric strength, both in sixty cycle breakdown and in impulse breakdown, substantially higher than 1,000 volts per mil for thin coatings of film. As is noted in the application Serial No. 135,194, now Patent No. 3,132,205 as the enamel coatings increase in thickness the dielectric strength in volts per mil decreases although the overall insulation strength of the film insulation increases. By providing a thin coat of an enamel film insulation, one may obtain the benefits of the high dielectric strength of such thin coating of enamel film. However, due to the high dissipation factor of some enamel films, the enamel itself is not sufficient in those installations where "hot spot" temperatures are experienced. Therefore, to obtain the desired low dissipation factor, a thin coating of a filamentary material having a low dissipation factor, that is, a high electrical resistance at high temperatures, is provided as a porous coating over the enamel film.

The following table indicates the test results which have been obtained by utilizing an insulation on an electrical conductor consisting of a thin film of enamel insulation covered by a thin porous coating of a polyamide filament yarn. In order to contrast these results with that of a film enamel insulation of a similar build, the table also provides the results obtained on tests of an electrical conductor insulated with a polyvinyl formal enamel film.

Table

| Sample | Total Insulation Build | Avg. 60 Cycle Breakdown, kv. | Avg. Impulse Breakdown, kv. | Dissipation Factor, percent 185° C.–200° C. | |
|---|---|---|---|---|---|
| .0605 Bare Wire covered with .0037" Polyvinyl Formal Enamel and .0049 Polyamide Filament | .0086 | 17.2 | 44 | 6.5 | 10 |
| .0508 Bare Wire covered with Polyvinyl Formal Enamel | .0086 | 15.2 | 32.4 | 33 | over 50 |

From the above table it can be readily seen that the same build of insulation thickness utilizing a polyvinyl formal enamel and a polyamide filament porous coating provides an increase in the sixty cycle breakdown strength and in the impulse breakdown strength, while at the same time substantially lowering the dissipation factor. Thus, from the above sample, it is readily apparent that the porous coating of a high temperature resistant filament over an enamel insulation provides an increase in the breakdown strength of the electrical conductor while at the same time substantially lowering the dissipation factor. Similar results have been obtained using polyester filament yarn.

From the above description of this invention, it can be seen that by means of the insulation provided by this invention an electrical conductor may be provided with an insulation which has substantially the same build as the normal enamel insulation, and will provide substantial increases in the sixty cycle and impulse breakdown strength over normal enamel insulation, while at the same time substantially lowering the dissipation factor. Thus, by means of the insulation of this invention, electrical conductors may be utilized in high temperature "hot spot" zones of electrical apparatus without danger of breakdown due to the loss of resistance of the insulation at the high temperatures of the "hot spots."

While there has been shown and described preferred embodiments of this invention, and while particular types of low dissipation factor filament material have been described, it should be understood by those skilled in this art that changes may be made in the insulation utilized without departing from the spirit of the invention hereinbefore disclosed. Further, it should be understood that in obtaining the desired porous coating that the pores of the coating should have at least one dimension of substantially 3 mils or less in order to obtain the desired results. The scope of the invention hereinbefore described is defined by the claims appended hereto.

What is claimed and new and which it is desired to secure by Letters Patent of the United States is:

1. An electrical conductor having an insulating coating providing a low dissipation factor and high electrical strength consisting of a base coating of enamel material on said conductor with a porous coating of high temperature resistant filamentary material covering said base coating, the pores of said porous coating measuring not more than 3 mils in at least one dimension.

2. An electrical conductor having an insulation coating providing a low dissipation factor and high electrical strength consisting of a base coating of an enamel material on said conductor with a porous coating of filamentary material covering said base coating, said filamentary material selected from the group consisting of polyamide filament yarn and polyester filament yarn, and the pores of said porous coating measuring not more than 3 mils in at least one dimension.

3. A method of insulating an electrical conductor to provide an insulation having a low dissipation factor and high electrical strength comprising the steps of coating a bare electrical conductor with an enamel, curing said enamel coating and wrapping about said enamel coating a porous coating of filament material having high electrical resistance at temperatures of at least 175° C., the pores of said coating being not more than 3 mils in at least one dimension.

4. A method of insulating an electrical conductor to provide an insulation having a low dissipation factor and high electrical strength comprising the steps of coating a bare electrical conductor with an enamel, curing said enamel coating and wrapping about said enamel coating a porous coating of filamentary material selected from the group consisting of polyamide filament yarn and polyester filament yarn, the pores of said coating being not more than 3 mils in at least one dimension.

5. A method of insulating an electrical conductor to provide an insulation having a low dissipation factor and high electrical strength comprising the steps of coating a bare electrical conductor with a polyvinyl formal enamel film, curing said enamel film, and wrapping about said enamel film a porous coating of filamentary material selected from the group consisting of polyamide filament material and polyester filament material, the pores of said coating being not more than 3 mils in at least one dimension.

References Cited by the Examiner

UNITED STATES PATENTS

| | | | |
|---|---|---|---|
| 2,013,686 | 9/1935 | Homer | 156—53 |
| 2,313,234 | 3/1943 | Gavitt | 174—120.4 |
| 2,456,015 | 12/1948 | Orser | 174—69 |
| 2,606,134 | 8/1952 | Sanders. | |
| 2,631,186 | 3/1953 | Bondon | 174—120.4 X |
| 3,027,287 | 3/1962 | Hammer et al. | 156—56 |
| 3,132,205 | 5/1964 | Gray | 174—124 |
| 3,192,309 | 6/1965 | Zoder et al. | 156—53 X |

OTHER REFERENCES

Saran Advertisement. In Modern Plastics, p. 41, October 1945.

EARL M. BERGERT, *Primary Examiner.*

P. R. WYLIE, J. F. MATHEWS, *Assistant Examiners.*